(12) United States Patent
Lee et al.

(10) Patent No.: US 8,999,199 B2
(45) Date of Patent: Apr. 7, 2015

(54) ARTIFICIAL MARBLE HAVING NATURAL TEXTURES AND LUMINESCENT PATTERNS AND METHOD OF PREPARING THE SAME

(71) Applicant: Cheil Industries Inc., Gumi-si (KR)

(72) Inventors: Hee Cheol Lee, Yeosu-Si (KR); Chang Ho Son, Yeosu-Si (KR); Sung Jin An, Yeosu-Si (KR); Su Sun Jeong, Yeosu-Si (KR); Cheol Yeon Hwang, Yeosu-Si (KR); Han Ju Kang, Yeosu-Si (KR)

(73) Assignee: Cheil Industries Inc., Gumi-si (KR)

( * ) Notice: Subject to any disclaimer, the term of this patent is extended or adjusted under 35 U.S.C. 154(b) by 86 days.

(21) Appl. No.: 13/728,208

(22) Filed: Dec. 27, 2012

(65) Prior Publication Data

US 2013/0168607 A1    Jul. 4, 2013

(30) Foreign Application Priority Data

Dec. 29, 2011  (KR) .................. 10-2011-0145695
Dec. 29, 2011  (KR) .................. 10-2011-0145952
Dec. 29, 2011  (KR) .................. 10-2011-0146525

(51) Int. Cl.

| | | |
|---|---|---|
| *C09K 11/02* | (2006.01) | |
| *C04B 14/00* | (2006.01) | |
| *C08K 3/34* | (2006.01) | |
| *C08K 3/36* | (2006.01) | |
| *C08K 13/02* | (2006.01) | |
| *C08K 9/10* | (2006.01) | |
| *C08K 13/04* | (2006.01) | |
| *B44F 1/08* | (2006.01) | |
| *B44F 9/04* | (2006.01) | |
| *C04B 26/18* | (2006.01) | |
| *C04B 111/54* | (2006.01) | |
| *C04B 111/80* | (2006.01) | |

(52) U.S. Cl.
CPC . *C04B 14/00* (2013.01); *C08K 3/34* (2013.01); *C08K 3/36* (2013.01); *C08K 13/02* (2013.01); *C08K 9/10* (2013.01); *C08K 13/04* (2013.01); *C08K 2201/005* (2013.01); *B44F 1/08* (2013.01); *B44F 9/04* (2013.01); *C04B 26/18* (2013.01); *C09K 11/025* (2013.01); *C04B 2111/545* (2013.01); *C04B 2111/80* (2013.01); *C04B 2111/807* (2013.01)

(58) Field of Classification Search
CPC ........ C09K 11/02; C09K 11/025; B44F 1/08; B44F 9/04; C04B 2111/545; C04B 2111/807; C08K 3/34; C08K 3/36; C08K 13/04; C08K 13/02; C08K 9/10; C08K 2201/005
USPC ............... 252/301.36; 524/442, 493; 523/171
See application file for complete search history.

(56) References Cited

U.S. PATENT DOCUMENTS 6,309,562 B1 *  10/2001  Sakai et al. ............... 252/301.36
7,291,288 B2 *  11/2007  Yamanashi et al. ...... 252/301.36

* cited by examiner

*Primary Examiner* — Carol M Koslow
(74) *Attorney, Agent, or Firm* — Additon, Higgins & Pendleton, P.A.

(57) ABSTRACT

An artificial marble includes unsaturated polyester resin (A), compound including silica (B), and luminescent pigment (C). An artificial marble according to a second embodiment includes about 70 to about 95% by weight of a non-luminescent base material (I) comprising unsaturated polyester resin (A), compound including silica (B), and organic/inorganic pigment (C) and about 5 to about 30% by weight of a luminescent amorphous pattern part (II) comprising unsaturated polyester resin (A), compound including silica (B), and luminescent pigment (D). An artificial marble according to a third embodiment includes unsaturated polyester resin (A), compound including silica (B), and amorphous luminescent chip (C).

17 Claims, 7 Drawing Sheets
(7 of 7 Drawing Sheet(s) Filed in Color)

Figure 1a
Figure 1b
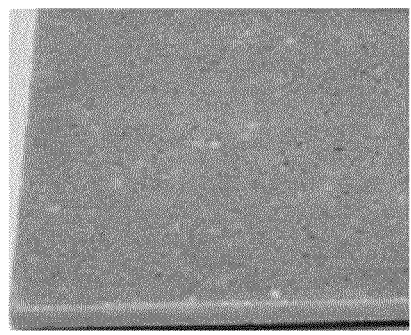
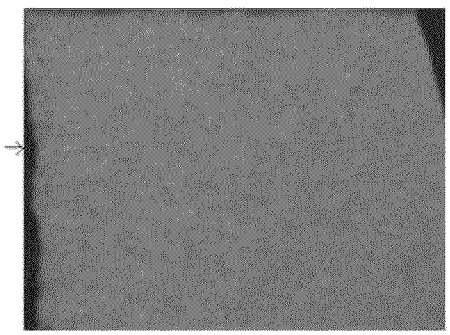
Figure 2a
Figure 2b
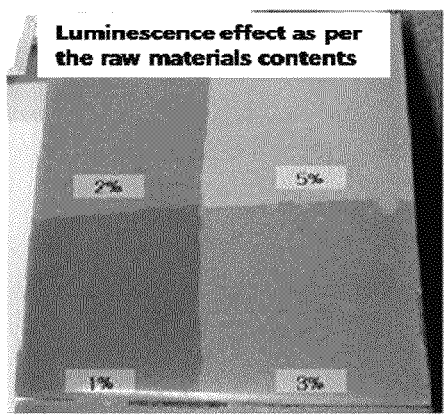
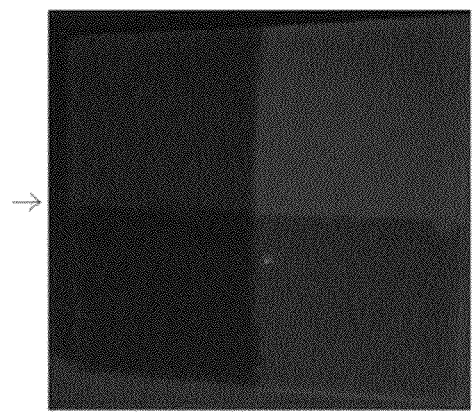

Figure 5
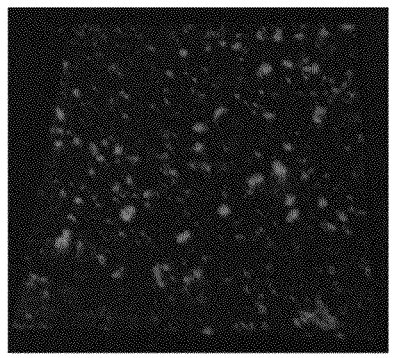
Figure 6a                                    Figure 6b
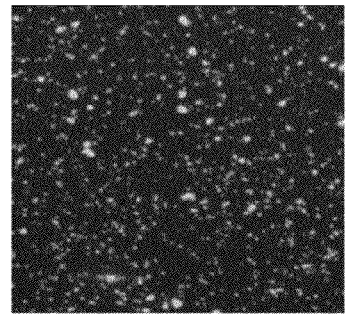
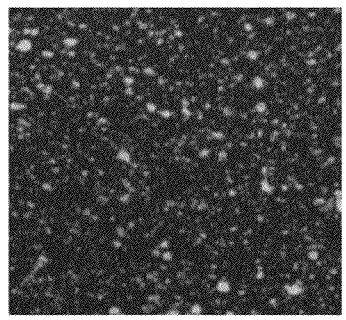
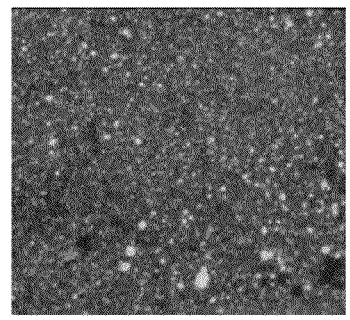
Figure 6c                                    Figure 6d

ARTIFICIAL MARBLE HAVING NATURAL TEXTURES AND LUMINESCENT PATTERNS AND METHOD OF PREPARING THE SAME

CROSS-REFERENCE TO RELATED APPLICATIONS

This application claims priority from Korea Patent Application Nos. 10-2011-0145952, 10-2011-0145695, and 10-2011-0146525, each filed Dec. 29, 2011, in the Korean Intellectual Property Office, the disclosure of each of which is incorporated herein by reference in its entirety.

FIELD OF THE INVENTION

This invention relates to artificial marble.

BACKGROUND OF THE INVENTION

Natural stones, such as granite and marble, can have beautiful patterns on the surface thereof and thus have been used as building decoration material. Recently, the demand for natural stones for use in applications such as flooring, wall panels, sinks and the like, has significantly increased. However, this demand cannot be met only with high cost natural stones. Accordingly, various artificial marbles are also being developed and used.

Natural stones can be converted into common artificial stone by mixing the natural stone with various materials, such as inorganic fillers, coloring agents, hardening agents, and acrylic or unsaturated polyester base resins. Natural stones reinforced by resin can be subject to a vacuum-compression molding process, in which a composition including natural inorganic (silica) minerals and binder resins are mixed in order to form an artificial marble that can exhibit the texture of a natural stone. This type of product is referred generally in the art as engineered stone.

Resin reinforced natural stones can be prepared to display various colors and textures similar to that of the natural stones, resin, or color of the pigment. Since the main component of resin reinforced natural stone is a natural mineral, it can exhibit excellent natural textures, generally better than that exhibited by a common artificial stone. Accordingly, the demand for the same has recently increased.

A resin reinforced natural stone can be manufactured in single color tone or in multi-color tones by adding different pigments, or can be manufactured to have natural stone textures by using stone chips.

Current resin reinforced natural stones, however, do not typically exhibit properties sufficient to meet the desires of customers who require different textures.

To improve the function and performance of artificial marbles, a luminous function in the artificial marble can be provided using light emitting materials, such as UV radiation light emitting materials. This method can express the stone textures either by coating luminescent dyes on the surface of the artificial marbles or by using luminescent chips. However, when luminescent dyes are coated on the marble, their effect does not last long. The property of uniform luminescence cannot be obtained by using luminescent light emitting chips.

Also, the luminescent function of existing luminescent artificial marbles is not sufficient enough to be suitable for various applications. That is, from the point of view of its luminescent performance, existing artificial marbles have a drawback of not having a clear luminescence for around 15 minutes, which may be required in accordance with evacuation requirements for initial brightness, i.e. during a power failure. In addition, the time required to maintain the luminescence of the artificial marble up to 3 mcd/m$^2$ as a lower limit to recognize the shape of object after irradiation with a light source is typically just one hour.

In addition, in existing luminescent artificial marbles, an excessive amount of luminescent pigment is typically used in order to achieve a sufficient luminescence performance. However, luminescent pigments are costly. Therefore, using an excessive amount of luminescent pigment increases the manufacturing cost, which would ultimately hinder commercialization. Therefore, there is a need to achieve sufficient luminescence property while keeping the amount of luminescent pigment used to a minimum.

SUMMARY OF THE INVENTION

The present invention relates to an artificial marble which can have natural textures and an appearance similar to that of natural stone. The artificial marble can further have luminescent patterns and can maintain a sufficient brightness for long durations.

The artificial marble can have an excellent luminescence effect while minimizing the content or amount of luminescent pigments.

The artificial marble can also have an excellent luminescence effect while not impairing surface hardness.

The artificial marble can also have a partial luminescence pattern while maintaining a natural stone texture.

One embodiment of the present invention (the first exemplary embodiment) provides an artificial marble comprising (A) an unsaturated polyester resin, (B) a compound including silica, and (C) a luminescent pigment. The artificial marble of the first embodiment can exhibit a maximum brightness of more than about 110 mcd/m$^2$ and can have an overall luminescence which maintains the brightness at higher than about 7 mcd/m$^2$ for longer than about one hour.

The artificial marble can include the unsaturated polyester resin (A) in an amount of about 7 to an amount of about 10% by weight, the compound including silica (B) in an amount of about 85 to an amount of about 91% by weight, and luminescent pigment (C) in an amount of about 2 to about 5% by weight, based on the total weight (100% by weight) of a composition including the unsaturated polyester resin (A), the compound including silica (B), and the luminescent pigment (C).

In exemplary embodiments, the compound including silica (B) includes natural stone particles (B1) in an amount of about 50 to about 80% by weight and inorganic filler (B2) in an amount of about 20 to about 50% by weight, based on the total weight (100% by weight) of the compound including silica (B).

Natural stone particles (B1) can include silica sand (b11) in an amount of about 15 to about 93% by weight and quartz chip (b12) in an amount of about 7 to about 85% by weight, based on the total weight (100% by weight) of the natural stone particles (B1).

The average particle size of the silica sand (b11) can range from about 0.1 to about 1.2 mm and the average particle diameter of the quartz chips (b12) can range from about 1.2 to about 9.0 mm.

The inorganic filler (B2) can be silica powder with an average particle diameter less than about 20 μm.

The artificial marble can further include an organic and/or inorganic pigment (D) (which is different from the luminescent pigment (C)) in an amount of about 0.1 to about 1 parts by weight based on about 100 parts by weight of a composition comprising the unsaturated polyester resin (A), the compound including silica (B), and the luminescent pigment (C).

Another embodiment of the present invention (the second exemplary embodiment) provides an artificial marble including about 70 to about 95% by weight of a non-luminescent base material (I) comprising an unsaturated polyester resin (A), a compound including silica (B) and an organic and/or inorganic pigment (C); and about 5 to about 30% by weight of a luminescent pattern part (II) comprising an unsaturated polyester resin (A), a compound including silica (B), and a luminescent pigment (D).

The non-luminescent base material (I) can include the organic and/or inorganic pigment (C) in an amount of about 0.1 to about 1 parts by weight based on about 100 parts by weight of a non-luminescent material (I') comprising about 7 to about 10% by weight of the unsaturated polyester resin (A) and about 90 to about 93% by weight of the compound including silica (B).

The luminescent pattern part (II) can include the unsaturated polyester resin (A) in an amount of about 7 to about 10% by weight, the compound including silica (B) in an amount of about 85 to about 91% by weight, and luminescent pigment (D) in an amount of about 2 to about 5% by weight, based on the total weight (100% by weight) of a composition including the unsaturated polyester resin (A), the compound including silica (B), and the luminescent pigment (D).

The compound including silica (B) can include natural stone particles (B1) in an amount of about 50 to about 80% by weight and inorganic fillers (B2) in an amount of about 20 to about 50% by weight, based on the total weight (100% by weight) of the compound including silica (B).

The natural stone particles (B1) can include silica sand (b11) in an amount of about 15 to about 93% by weight and quartz chips (b12) in an amount of about 7 to about 85% by weight, based on the total weight (100% by weight) of the natural stone particles (B1).

The artificial marble can be prepared by:

preparing a non-luminescent resin composition (I'') by mixing unsaturated polyester resin (A), compound including silica (B), and organic and/or inorganic pigment;

preparing a luminescent composition (II') by mixing unsaturated polyester resin (A), compound including silica (B), and luminescent pigment (D);

preparing a composition (III) by mixing about 70 to about 95% by weight of the non-luminescent resin composition (I'') with about 5 to about 30% by weight of the luminescent composition (II'); and compression molding the composition (III) to form an artificial marble, for example by supplying the composition (III) to a stacking plate in the form of sheets and compression molding the composition (III) under high pressure.

The resultant prepared artificial marble can have a natural texture and the property of luminescence.

Another embodiment of the present invention (the third embodiment) is an artificial marble comprising (A) an unsaturated polyester resin, (B) a compound including silica, and (C) amorphous luminescent chips. The artificial marble has a total cross-sectional area and the luminescent chips (C) can be distributed within the artificial marble in an area comprising about 3 to about 10% of the total cross-sectional area of the artificial marble.

The artificial marble can include the unsaturated polyester resin (A) in an amount of about 5 to about 15% by weight, the compound including silica (B) in an amount of about 75 to about 92% by weight, and the amorphous luminescent chips (C) in an amount of about 3 to about 10% by weight, based on the total weight (100% by weight) of a composition including the unsaturated polyester resin (A), the compound including silica (B), and the amorphous luminescent chips (C).

The artificial marble can further include organic and/or inorganic pigment in an amount of about 0.01 to about 1 parts by weight based on about 100 parts by weight of the unsaturated polyester resin (A), compound including silica (B), and luminescent chips (C).

The amorphous luminescent chips (C) can comprise an unsaturated polyester resin (A) in an amount of about 5 to about 15% by weight, a compound including silica (B) in an amount of about 80 to about 93% by weight, and luminescent pigment (E) in an amount of 2 to about 5% by weight. The average particle diameter of the amorphous luminescent chips (C) can range from about 0.1 to about 5.6 mm.

The compound including silica (B) can include natural stone particles (B1) in an amount of about 50 to about 80% by weight and inorganic filler (B2) in an amount of about 20 to about 50% by weight, based on the total weight (100% by weight) of the compound including silica (B).

The natural stone particles can be a mixture of silica sand (b11) having an average particle size of about 0.1 to about 1.2 mm and quartz chips (b12) having an average particle diameter of about 1.2 to about 9.0 mm.

The natural stone particles (B1) can include silica sand (b11) in an amount of about 50 to about 85% by weight and quartz chips (b12) in an amount of about 15 to about 50% by weight, based on the total weight (100% by weight) of the natural stone particles (B1).

The inorganic filler (B2) can be silica powder with an average particle diameter of less than about 20 μm.

The artificial marble can be prepared by:

preparing an amorphous luminescent chip (C), preparing an artificial marble composition by mixing the unsaturated polyester resin (A), compound including silica (B), amorphous luminescent chip (C) and an organic and/or inorganic pigment (D), forming the artificial marble composition into a certain shape, for example by dispersing the composition using dispersing equipment, and subjecting the composition to vacuum-vibration-compression to uniformly distribute the amorphous luminescent chip (C) in the composition and form an artificial marble.

The amorphous luminescent chip (C) can be prepared by:

mixing the unsaturated polyester resin (A), compound including silica (B), and luminescent pigment (E) to form an amorphous luminescent chip composition, molding the amorphous luminescent chip composition by vacuum-vibration-compression to uniformly distribute luminescent pigment (E) in the amorphous luminescent chip composition to form an article (for example a plate) of the amorphous luminescent chip composition having a luminescence effect, and crushing the plate having a luminescence effect to provide amorphous luminescent chips (C).

An artificial marble in accordance with the present invention can have an excellent luminescence effect while keeping the content (amount) of luminescent pigment to a minimum. In addition, the artificial marble can have a natural stone-like texture in light without impairing the surface hardness. The artificial marble can also exhibit a new texture because it can have a partial luminescence effect in the dark.

BRIEF DESCRIPTION OF THE FIGURES

The patent or application file contains at least one drawing and at least one photograph executed in color. Copies of this patent or patent application publication with color drawing(s)

and/or color photographs(s) will be provided by the Office upon request and payment of the necessary fee.

FIGS. 1a and 1b are photographs of a luminescent artificial marble in accordance with the first embodiment of the invention, taken in naturally illuminated and dark room conditions respectively.

FIGS. 2a and 2b are photographs showing the luminescence effect of the artificial marble according to the amount of luminescent pigment in accordance with the first embodiment.

FIG. 5 is a photograph of an artificial marbles in accordance with the second embodiment taken in a dark room condition.

FIGS. 6a, 6b, 6c, and 6d are photographs of artificial marble with amounts of a luminescent resin composition in accordance with the second embodiment of the invention and photographs of artificial marble with amounts of a luminescent resin composition outside of the invention.

DETAILED DESCRIPTION OF THE INVENTION

Figure 3A:
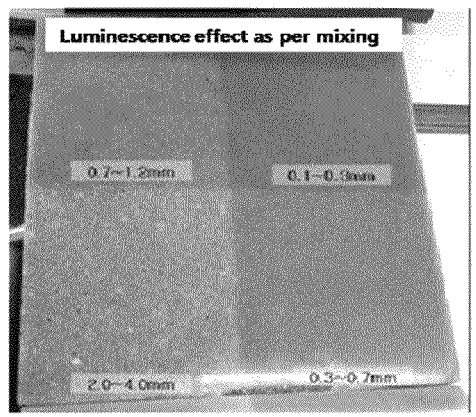
FIGS. 3a and 3b are photographs showing the luminescence effect of the artificial marbles based on the average particles diameter of natural stone in accordance with the first embodiment.
Figure 3B:
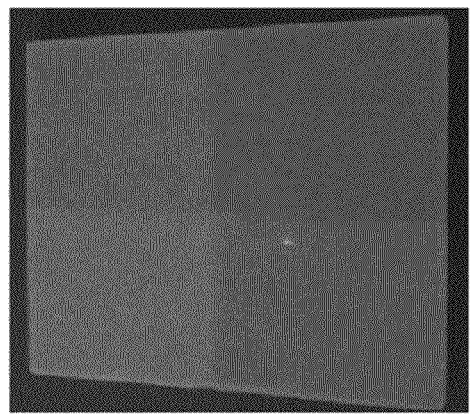
Figure 4:
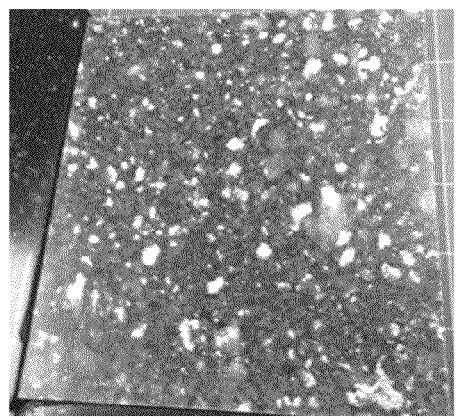
FIG. 4 is a photograph of an artificial marble in accordance with the second embodiment of the invention taken under an illuminated room condition.
Figure 7A:
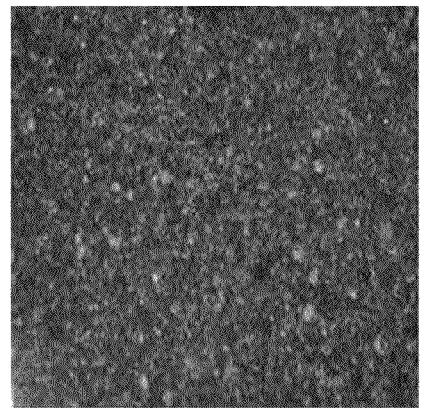
FIGS. 7a and 7b are photograph of artificial marble in accordance with the third embodiment of the invention taken in an illuminated room and dark room conditions respectively.
Figure 7B:
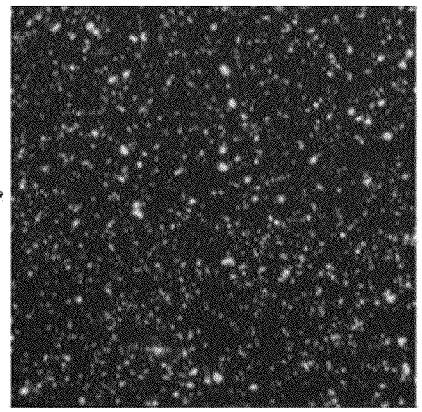
Figure 8A:
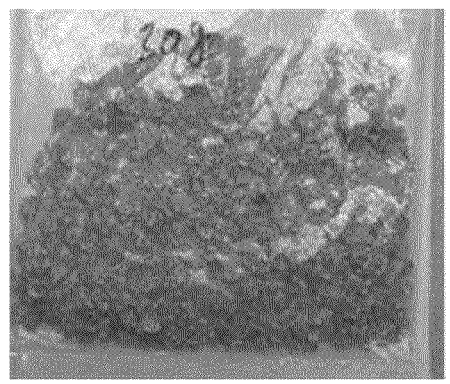
FIGS. 8a and 8b are photographs of luminescent chips in accordance with the third embodiment of the invention taken in an illuminated room and dark room conditions respectively.
Figure 8B:
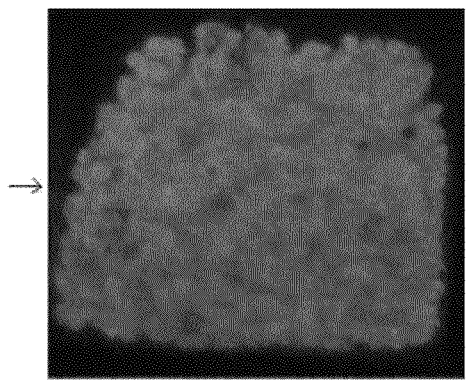

The present invention now will be described more fully hereinafter in the following detailed description of the invention in which some but not all embodiments of the invention are described. Indeed, this invention may be embodied in many different forms and should not be construed as limited to the embodiments set forth herein; rather, these embodiments are provided so that this disclosure will satisfy applicable legal requirements.

The First Embodiment

An artificial marble in accordance with the first embodiment of the present invention includes (A) an unsaturated polyester resin, (B) a compound including silica, and (C) luminescent pigment. The maximum brightness of the artificial marble can be higher than about 110 mcd/m² and the artificial marble can have an overall luminescence which maintains the brightness of the marble at higher than about 7 mcd/m² for longer than about one hour.

The artificial marble can include the unsaturated polyester resin (A) in an amount of about 7 to about 10% by weight, the compound including silica (B) in an amount of about 85 to about 91% by weight, and the luminescent pigment (C) in an amount of about 2 to about 5% by weight, wherein the amounts of (A), (B), and (C) are each based on the total weight (about 100% by weight) of (A), (B), and (C).

Herein, each component of the composition in accordance with the first embodiment is described in detail.

(A) Unsaturated Polyester Resin

In accordance with the present invention, a resin composition envelopes (coats or surrounds) natural stone particles (which form a skeleton of the artificial marble) and inorganic fillers.

Stated differently, the resin composition can form a continuous phase or matrix of the artificial marble, and the natural stone particles and/or inorganic fillers can be distributed in the matrix and form the disperse phase of the artificial marble.

The resin composition also bonds (is cured) with a cross-linking agent. The resin composition can provide elasticity or tensile strength when the artificial marble is formed.

In accordance with the present invention, unsaturated polyester resin (UPE resin) can be used as a resin composition. Unsaturated polyester resin can have an excellent bonding force with natural stone particles and inorganic fillers. The unsaturated polyester resin which is used in this invention is known in the art and is commercially available.

Generally the unsaturated polyester resin can be an esterification product of a polybasic acid and a polyvalent alcohol, wherein the polybasic acid and/or the polyvalent alcohol compound includes an unsaturated portion.

Unsaturated carboxylic acid, polycarboxylic acid anhydride, polycarboxylic acid halide, polycarboxylic acid, and the like, and mixtures thereof can be used as the polybasic acid. In addition, phthalic acid, isophthalic acid, terephthalic acid, succinic acid and the like and mixtures thereof, which are normally used in the preparation of the polyester resin, can be used.

Divalent alcohols such as ethylene glycol, diethylene glycol, propylene glycol, dipropylene glycol, 1,3-butanediol, 1,6-hexanediol, neopentyl glycol, and 1,4-cyclohexanediol; trivalent alcohols such as glycerin; tetravalent alcohol such as pentaerythritol; and the like and combinations thereof can be used as the polyhydric alcohols.

Other examples of unsaturated polyhydric alcohols include without limitation butene diol, pentene diol, allyl or vinyl glycerol ether, allyl or vinyl pentaerythritol, and the like and mixtures thereof.

The weight average molecular weight of the unsaturated polyester resin can be about 70,000 to about 100,000 g/mol. The higher the molecular weight of the unsaturated polyester resin, the better is its bonding force with natural stone particles so that even if part of the resin is trimmed out during the grinding process, the exposed natural stone particles exposed can remain effectively fixed. If the weight average molecular weight of the unsaturated polyester resin is below about 70,000 g/mol, then natural stone particles may stray out of the surface of the artificial marble. If the weight average molecular weight of the unsaturated polyester resin exceeds about 100,000 g/mol, its viscosity becomes too high so that it may not be mixed with natural stone particles.

The artificial marble can include the unsaturated polyester resin (A) in an amount of about 7.0 to about 10.0% by weight based on about 100% by weight (the total weight) of a composition comprising the unsaturated polyester resin (A), compound including silica (B), and luminescent pigment (C).

In some embodiments, the artificial marble can include the unsaturated polyester resin (A) in an amount of about 7, 8, 9, or 10% by weight. Further, according to some embodiments of the present invention, the unsaturated polyester resin (A)

may be present in an amount of from about any of the foregoing amounts to about any other of the foregoing amounts.

If the artificial marble includes the unsaturated polyester resin in an amount less than about 7.0% by weight, then its binding force with the natural stone particles can decrease. If the artificial marble includes the unsaturated polyester resin in an amount more than about 10.0% by weight, then the appearance and texture of the natural stone can be lost.

(B) Compound Including Silica

The artificial marble can include the compound including silica (B) in an amount of about 85 to about 91% by weight based on about 100% by weight (the total weight) of a composition comprising the unsaturated polyester resin (A), compound including silica (B), and luminescent pigment (C).

In some embodiments, the artificial marble can include the compound including silica (B) in an amount of about 85, 86, 87, 88, 89, 90, or 91% by weight. Further, according to some embodiments of the present invention, the compound including silica (B) may be present in an amount of from about any of the foregoing amounts to about any other of the foregoing amounts.

The appearance and texture of the artificial marble can more closely resemble that of natural stone by including the compound including silica at high percentages.

The compound including silica (B) can include natural stone particles (B1) in an amount of about 50 to about 80% by weight and inorganic filler (B2) in an amount of about 20 to about 50% by weight, based on the total weight (about 100% by weight) of the compound including silica (B).

In some embodiments, the compound including silica (B) can include the natural stone particles (B1) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the natural stone particles (B1) may be present in an amount of from about any of the foregoing amounts to about any other of the foregoing amounts.

In some embodiments, the compound including silica (B) can include inorganic filler (B2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the inorganic filler (B2) may be present in an amount of from about any of the foregoing amounts to about any other of the foregoing amounts.

(B1) Natural Stone Particles

The compound including silica (B) of the artificial marble can include natural stone particles (B1) as majority component to form an appearance and texture closer to that of the natural stone. Various inorganic aggregates from natural sources can be used as natural stone particles. In exemplary embodiments, the natural stone particles can be transparent to increase the luminescence effect. Transparent natural stone particles can enhance dispersion or scattered reflection inside the artificial marble and most of the luminescent pigment helps in absorbing the light energy.

Examples of the transparent natural stone particles (B1) include without limitation silica sand, quartz chips, quartz, and the like, and mixtures thereof.

Minerals of various sizes can be used as natural stone particles (B1). In exemplary embodiments, particles having an average diameter of about 0.1 to about 9.0 mm can be used. In some embodiments, the average diameter of the natural stone particles can be about 0.1, 0.2, 0.3, 0.4, 0.5, 0.6, 0.7, 0.8, 0.9, 1, 2, 3, 4, 5, 6, 7, 8, or 9 mm. Further, according to some embodiments of the present invention, the average diameter of the natural stone particles can be from about any of the foregoing amounts to about any other of the foregoing amounts.

If natural stone particles having an average particle diameter below about 0.1 mm are used, the time to reach a brightness of about 3 mcd/m$^2$ becomes shorter, such as 0.5 to 1 hour. The luminescence performance can be increased by increasing the mixing ratio of the luminescent pigment. Because the luminescent pigment is relatively costly, however, the raw materials cost would be increased if this pigment is included in large quantity. Meanwhile, if the average particle diameter is increased above about 9.0 mm, then the strength of the artificial marble can be reduced.

In exemplary embodiments, the natural stone particles (B1) can include silica sand (b11) and quartz chips (b12) with different average particle diameters. The average particle diameter of silica sand (b11) can range from about 0.1 to about 1.2 mm, and the average particle diameter of quartz chips (b12) can range from about 1.2 to about 9.0 mm.

In some embodiments, the average diameter of the silica sand (b11) can be about 0.1, 0.2, 0.3, 0.4, 0.5, 0.6, 0.7, 0.8, 0.9, 1, 1.1, or 1.2 mm. Further, according to some embodiments of the present invention, the average diameter of the silica sand (b11) can be from about any of the foregoing amounts to about any other of the foregoing amounts.

In some embodiments, the average diameter of the quartz chips (b12) can be about 1.2, 1.3, 1.4, 1.5, 1.6, 1.7, 1.8, 1.9, 1, 2, 3, 4, 5, 6, 7, 8, or 9 mm. Further, according to some embodiments of the present invention, the average diameter of the quartz chips (b12) can be from about any of the foregoing amounts to about any other of the foregoing amounts.

The natural stone particles (B1) can include silica sand (b11) in an amount of about 15 to about 93% by weight and quartz chips (b12) in an amount of about 7 to about 85% by weight, based on the total weight (100% by weight) of the natural stone particles (B1).

In some embodiments, the natural stone particles (B1) can include silica sand (b11) in an amount of about 15, 16, 17, 18, 19, 20, 21, 22, 23, 24, 25, 26, 27, 28, 29, 30, 31, 32, 33, 34, or 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, or 93% by weight. Further, according to some embodiments of the present invention, the silica sand (b11) may be present in an amount of from about any of the foregoing amounts to about any other of the foregoing amounts.

In some embodiments, the natural stone particles (B1) can include quartz chips (b12) in an amount of about 7, 8, 9, 10, 11, 12, 13, 14, 15, 16, 17, 18, 19, 20, 21, 22, 23, 24, 25, 26, 27, 28, 29, 30, 31, 32, 33, 34, or 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, or 85% by weight. Further, according to some embodiments of the present invention, the quartz chips (b12) may be present in an amount of from about any of the foregoing amounts to about any other of the foregoing amounts.

When the natural stone particles (B) include silica sand (b11) and quartz chips (b12) in amounts within the above range, this can provide a good texture of the natural stone and a luminescence effect to the artificial marble. This can also be cost effective.

The compound including silica (B) can include the natural stone particles (B1) in an amount of about 50 to about 80% by weight based on the total weight (100% by weight) of the compound including silica (B).

In some embodiments, the compound including silica (B) can include the natural stone particles (B1) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the natural stone particles (B1) may be present in an amount of from about any of the foregoing amounts to about any other of the foregoing amounts.

When the compound including silica (B) includes the natural stone particles (B1) in an amount within the above range, this can provide good luminescence and can be cost effective.

(B2) Inorganic Filler

In accordance with the present invention, inorganic filler having an average particle diameter that is less than the average diameter of the natural particles can be further included. This inorganic filler can minimize the quantity of resin composition used. Thus the appearance and texture can be maintained at maximum which ultimately contributes in compacting the artificial marble.

Examples of the inorganic filler (B2) can include without limitation silica powder, aluminum hydroxide, glass powder, quartz powder, calcium carbonate and the like and combinations thereof. In exemplary embodiments, the inorganic filler can include silica powder of the nature stone. The average particle size of inorganic filler (B2) can be less than 20 about μm.

The compound including silica (B) can include the inorganic filler (B2) in an amount of about 20 to about 50% by weight based on the total weight (100% by weight) of the compound including silica (B).

In some embodiments, the compound including silica (B) can include the inorganic filler (B2) in an amount of about 20, 21, 22, 23, 24, 25, 26, 27, 28, 29, 30, 31, 32, 33, 34, or 35, 36, 37, 38, 39, 40, 41, 42, 43, 44, 45, 46, 47, 48, 49, or 50% by weight. Further, according to some embodiments of the present invention, the inorganic filler (B2) may be present in an amount of from about any of the foregoing amounts to about any other of the foregoing amounts.

If the amount of inorganic filler is less than about 20% by weight, it can be difficult to successfully mold the composition. If the amount of inorganic filler is more than about 50% by weight, the unsaturated polyester resin (A) content can become too high which can cause deterioration of the physical properties on the surface of the product.

(C) Luminescent Pigment

The luminescent pigment which gives the property of luminescence to the artificial marble in accordance with the present invention can be used without any restriction if it is a luminescent pigment. Examples of the luminescent pigment include without limitation aluminate strontium pigment, zinc sulfate pigment, and the like, and mixtures thereof.

The luminescent pigment (C) can have an average particle diameter of about 6 to about 150 μm. In some embodiments, the luminescent pigment (C) can have an average particle diameter of about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or 150 μm. Further, according to some embodiments of the present invention, the luminescent pigment (C) can have an average particle diameter from about any of the foregoing amounts to about any other of the foregoing amounts.

If the average particle diameter of luminescent pigment (C) is less than about 6 μm, the luminescence performance can be reduced. If the average particle diameter of luminescent pigment (C) is greater than about 150 μm, then the duration of irradiation to make saturation at initial stage becomes longer.

Because the luminescent pigment is costly, it can be important to maximize the luminescence performance of the artificial marble while minimizing the amount of the luminescent pigment used.

In exemplary embodiments, the artificial marble can include the luminescent pigment such as zinc sulfate in an amount of about 2.0 to about 5.0% by weight, based on the total weight (100% by weight) of (A), (B), and (C).

In some embodiments, the artificial marble can include the luminescent pigment such as zinc sulfate in an amount of about 2, 3, 4, or 5% by weight. Further, according to some embodiments of the present invention, the luminescent pigment such as zinc sulfate may be present in an amount of from about any of the foregoing amounts to about any other of the foregoing amounts.

If the artificial marble includes the luminescent pigment (C) in an amount less than about 2.0% by weight, a sufficient luminescence effect may not be achieved. If the artificial marble includes the luminescent pigment in an amount greater than about 5.0% by weight, then it may not be economically feasible and additional luminescent effect may not occur even if it is used in excess.

(D) Organic and/or Inorganic Pigments

Organic and/or inorganic pigments in accordance with the present invention can be used to introduce the color which exhibits a luminescence property. The artificial marble may include an organic pigment, an inorganic pigment, or a mixture thereof, Examples of the organic and/or inorganic pigments can include without limitation azo series pigments, phthalocyanine series pigments, and the like, and mixtures thereof.

The artificial marble can include the organic and/or inorganic pigment in an amount of about 0.1 to 1 parts by weight based on about 100 parts by weight of a composition comprising the unsaturated polyester resin (A), compound including silica, and luminescent pigment (C).

In some embodiments, the artificial marble can include the organic and/or inorganic pigment in an amount of about 0.1, 0.2, 0.3, 0.4, 0.5, 0.6, 0.7, 0.8, 0.9, or 1 part by weight. Further, according to some embodiments of the present invention, the organic and/or inorganic pigment may be present in an amount of from about any of the foregoing amounts to about any other of the foregoing amounts.

(E) Other Additives

In accordance with the present invention, the artificial marble can include one or more other additives, such as but not limited to a hardening agent (E1) to solidify the artificial marble. In this case, a hardening accelerator (E2) can also be used to enhance the hardening reaction.

The artificial marble can include the hardening agent (E1) in an amount of about 0.1 to about 0.2 parts by weight and the hardening accelerator (E2) in an amount of about 0.01 to about 0.02 parts by weight, each based on about 100 parts by weight of a composition comprising the unsaturated polyester resin (A), compound including silica (B), and luminescent pigment (C).

In addition, a cross-linking agent (E3) can be used to bond unsaturated polyester resin, natural stone particles, and inorganic fillers. An exemplary cross-linking agent is a silane cross-linking agent. The artificial marble can include the silane cross-linking agent in an amount of about 0.05 to about 0.1 parts by weight based on about 100 parts by weight of a composition comprising the unsaturated polyester resin (A), compound including silica (B), and luminescent pigment (C).

The Second Embodiment

An artificial marble in accordance with the second embodiment of the invention comprises about 70 to about 95% by weight of a non-luminescent base material (I) comprising unsaturated polyester resin (A), compound including silica (B), and organic and/or inorganic pigment (C) and about 5 to about 30% by weight of a luminescent amorphous pattern part (II) comprising unsaturated polyester resin (A), compound including silica (B), and luminescent pigment (D).

In some embodiments, the artificial marble can include the non-luminescent base material (I) in an amount of about 70, 71, 72, 73, 74, 75, 76, 77, 78, 79, 80, 81, 82, 83, 84, 85, 86, 87, 88, 89, 90, 91, 92, 93, 94, or 95% by weight. Further, according to some embodiments of the present invention, the non-luminescent base material (I) may be present in an amount of from about any of the foregoing amounts to about any other of the foregoing amounts.

In some embodiments, the artificial marble can include the luminescent amorphous pattern part (II) in an amount of about 5, 6, 7, 8, 9, 10, 11, 12, 13, 14, 15, 16, 17, 18, 19, 20, 21, 22, 23, 24, 25, 26, 27, 28, 29, or 30% by weight. Further, according to some embodiments of the present invention, the luminescent amorphous pattern part (II) may be present in an amount of from about any of the foregoing amounts to about any other of the foregoing amounts.

The artificial marble has a total surface area, and the luminescent pattern part (II) can comprise about 5 to about 30% of the total surface area of the artificial marble. In some embodiments, the luminescent amorphous pattern part (II) can comprise about 5, 6, 7, 8, 9, 10, 11, 12, 13, 14, 15, 16, 17, 18, 19, 20, 21, 22, 23, 24, 25, 26, 27, 28, 29, or 30% of the total surface area of the artificial marble. Further, according to some embodiments of the present invention, the luminescent amorphous pattern part (II) may comprise a percentage of the total surface area of the artificial marble in an amount of from about any of the foregoing amounts to about any other of the foregoing amounts.

The non-luminescent base material (I) can include the unsaturated polyester resin (A) in an amount of about 7 to about 10% by weight and compound including silica (B) in an amount of about 90 to about 93% by weight, based on the total weight (100% by weight) of the unsaturated polyester resin (A) and the compound including silica (B) present in the non-luminescent base material (I).

In addition, the non-luminescent base material (I) can include the organic/inorganic pigment (C) in an amount of about 0.1 to about 1 parts by weight based on about 100 parts by weight of the unsaturated polyester resin (A) and the compound including silica (B).

In some embodiments, the non-luminescent base material (I) can include the unsaturated polyester resin (A) in an amount of about 7, 8, 9, or 10% by weight. Further, according to some embodiments of the present invention, the unsaturated polyester resin (A) may be present in an amount of from about any of the foregoing amounts to about any other of the foregoing amounts.

In some embodiments, the non-luminescent base material (I) can include the compound including silica (B) in an amount of about 90, 91, 92, or 93% by weight. Further, according to some embodiments of the present invention, the compound including silica (B) may be present in an amount of from about any of the foregoing amounts to about any other of the foregoing amounts.

In some embodiments, the non-luminescent base material (I) can include the organic/inorganic pigment (C) in an amount of about 0.1, 0.2, 0.3, 0.4, 0.5, 0.6, 0.7, 0.8, 0.9, or 1 part by weight. Further, according to some embodiments of the present invention, the organic/inorganic pigment (C) may be present in an amount of from about any of the foregoing amounts to about any other of the foregoing amounts.

The luminescent amorphous pattern part (II) can include the unsaturated polyester resin (A) in an amount of about 7 to about 10% by weight, compound including silica (B) in an amount of about 85 to about 91% by weight, and luminescent pigment (C) in an amount of about 2 to about 5% by weight, based on the total weight (100% by weight) of the luminescent amorphous pattern part (II).

In some embodiments, the luminescent amorphous pattern part (II) can include the unsaturated polyester resin (A) in an amount of about 7, 8, 9, or 10% by weight. Further, according to some embodiments of the present invention, the unsaturated polyester resin (A) may be present in an amount of from about any of the foregoing amounts to about any other of the foregoing amounts.

In some embodiments, the luminescent amorphous pattern part (II) can include the compound including silica (B) in an amount of about 85, 86, 87, 88, 89, 90, or 91% by weight. Further, according to some embodiments of the present invention, the compound including silica (B) may be present in an amount of from about any of the foregoing amounts to about any other of the foregoing amounts.

In some embodiments, the luminescent amorphous pattern part (II) can include the luminescent pigment (C) in an amount of about 2, 3, 4, or 5% by weight. Further, according to some embodiments of the present invention, the luminescent pigment (C) may be present in an amount of from about any of the foregoing amounts to about any other of the foregoing amounts.

Herein, each component of the artificial marble in the second embodiment is described in detail.

(A) Unsaturated Polyester Resin

The unsaturated polyester resin which is used in the second embodiment is the same as that described herein in the first embodiment.

The non-luminescent base material (I) can include the unsaturated polyester resin (A) in an amount of about 7 to about 10% by weight based on the total weight (100% by weight) of the unsaturated polyester resin (A) and the compound including silica (B) present in non-luminescent base material (I).

The luminescent amorphous pattern part (II) can include the unsaturated polyester resin in an amount of about 7 to about 10% by weight based on the total weight (100% by weight) of luminescent amorphous pattern part (II).

If unsaturated polyester resin is included in an amount less than about 7% by weight in either the non-luminescent base material (I) or the luminescent amorphous pattern part (II), the bonding force between the natural stone particles can be impaired. If the amount of unsaturated polyester resin is greater than about 10% by weight in either the non-luminescent base material (I) or the luminescent amorphous pattern part (II), the appearance and texture of the natural stone can be lost.

(B) Compound Including Silica

The compound including silica in the second embodiment is the same one as that described in the first embodiment.

The non-luminescent base material (I) can include the compound including silica (B) in an amount of about 90 to about 93% by weight based on the total weight (100% by weight) of the unsaturated polyester resin (A) and the compound including silica (B) present in the non-luminescent base material (I) composition.

The luminescent amorphous pattern part (II) can include the compound including silica (B) in an amount of about 85 to about 91% by weight based on the total weight (100% by weight) of the luminescent amorphous pattern part (II).

Including the compound including silica in higher amounts can allow the formation of an artificial marble with an appearance and texture closer to that of natural stone.

The compound including silica can include natural stone particles (B1) in an amount of about 50 to about 80% by weight and inorganic filler (B2) in an amount of about 20 to about 50% by weight based on the total weight (100% by weight) of the compound containing silica (B). The natural stone particles (B1) and inorganic filler (B2) in the second embodiment are the same as described in the first embodiment.

In some embodiments, the compound including silica (B) can include the natural stone particles (B1) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the natural stone particles (B1) may be present in an amount of from about any of the foregoing amounts to about any other of the foregoing amounts.

In some embodiments, the compound including silica (B) can include the inorganic filler (B2) in an amount of about 20, 21, 22, 23, 24, 25, 26, 27, 28, 29, 30, 31, 32, 33, 34, or 35, 36, 37, 38, 39, 40, 41, 42, 43, 44, 45, 46, 47, 48, 49, or 50% by weight. Further, according to some embodiments of the present invention, the inorganic filler (B2) may be present in an amount of from about any of the foregoing amounts to about any other of the foregoing amounts.

(C) Organic and/or Inorganic Pigment

In the second embodiment, organic and/or inorganic pigments can be further included to diversify the color which displays a luminescence. Examples of the organic and/or inorganic pigments can include without limitation azo series pigments, phthalocyanine series pigments, and the like, and mixtures thereof.

The non-luminescent base material (I) can include organic and/or inorganic pigments for example azo and/or phthalocyanine series pigments in an amount of about 0.1 to about 1 parts by weight based on about 100 parts by weight of the unsaturated polyester resin (A) and compound including silica (B) of the non-luminescent base material (I).

In some embodiments, the non-luminescent base material (I) can include organic and/or inorganic pigments in an amount of about 0.1, 0.2, 0.3, 0.4, 0.5, 0.6, 0.7, 0.8, 0.9, or 1 part by weight. Further, according to some embodiments of the present invention, the organic and/or inorganic pigments may be present in an amount of from about any of the foregoing amounts to about any other of the foregoing amounts.

(D) Luminescent Pigment

The luminescent pigment in the second embodiment is the same luminescent pigment (C) that was used in the first embodiment.

(E) Other Additives

The artificial marble can further include a hardening agent (E1) to harden the artificial marble. A hardening accelerator (E2) can also be used to enhance the hardening reaction. The artificial marble can include the hardening agent (E1) in an amount of about 0.1 to about 0.2 parts by weight and hardening accelerator (E2) in an amount of about 0.01 to about 0.02 parts by weight, each based on about 100 parts by weight of the non-luminescent base material (I) and/or the luminescent amorphous pattern part (II).

In addition, a cross-linking agent (E3) can be used to bond the unsaturated polyester resin, natural stone particles, and inorganic fillers. The cross-linking agent can be a silane cross-linking agent. The artificial marble can include the cross-linking agent in an amount of about 0.05 to about 0.1 parts by weight based on about 100 parts by weight of the non-luminescent base material (I) and/or luminescent amorphous pattern part (II).

Method of Preparation of the Artificial Marble in Accordance with the Second Embodiment Preparation of Resin Composition A non-luminescent resin composition (I") which forms the non-luminescent base material (I) can be prepared by mixing unsaturated polyester resin (A), compound including silica (B), and organic and/or inorganic pigment (C) using a mixer.

A luminescent resin composition (II') which forms luminescent amorphous pattern part (II) can be prepared by mixing unsaturated polyester resin (A), compound including silica (B), and luminescent pigment (D) using a mixer. Because the luminescent resin composition (II') includes high cost luminescent pigment, it can be mixed in a separate mixer.

The non-luminescent resin composition (I") can include organic and/or inorganic pigment (C) in an amount of about 0.1 to about 1 parts by weight based on about 100 parts by weight of a non-luminescent base material composition (I') which includes unsaturated polyester resin (A) in an amount of about 7 to about 10% by weight and the compound including silica (B) in an amount of about 90 to about 93% by weight.

Luminescent resin composition (II') includes unsaturated polyester resin (A) in an amount of about 7 to about 10% by weight, compound including silica (B) in an amount of about 85 to about 91% by weight, and luminescent pigment in an amount of about 2 to about 5% by weight.

Each of the non-luminescent resin composition (I") and luminescent resin composition (II') can further include hardening agent (E1) in an amount of about 0.1 to about 0.2 parts by weight and hardening accelerator (E2) in an amount of about 0.01 to about 0.02 parts by weight, each based on about 100 parts by weight of the non-luminescent resin composition (I") and/or about 100 parts by weight of the luminescent resin composition (II').

Each of the luminescent resin composition (I") and luminescent resin composition (II) can also include a silane cross-linking agent in an amount of about 0.05 to about 0.1 parts by weight, based on about 100 parts by weight of the non-luminescent resin composition (I") and/or about 100 parts by weight of the luminescent resin composition (II').

Mixing the Non-Luminescent Resin Composition (I") and Luminescent Resin Composition (II')

A composition (III) can be prepared by mixing about 70 to about 95% by weight of the non-luminescent resin composition (I") and about 5 to about 30% by weight luminescent resin composition (II').

During the formation of the composition (III), the non-luminescent resin composition (I") can be separately supplied from a multiple number of mixers to regulate the rate at which the non-luminescent resin composition (I") is supplied. Each of the non-luminescent resin composition (I") and luminescent resin composition (II') supplied from each mixer can be partially mixed by a line mixer.

The prepared composition (III) can be supplied to a stacking plate in the form of a sheet and can be subject to a vacuum-compression-molding process as known in the art to complete the artificial marble preparation.

The artificial marble in accordance with the second embodiment can have the appearance and texture overall of natural stone existing in a bright place and can form a partially luminescent pattern by the luminescent pigment in the luminescent amorphous pattern part (II) when the illumination becomes dark as shown in FIG. 5.

The Third Embodiment

An artificial marble in accordance with the third embodiment of the present invention comprises (A) an unsaturated polyester resin, (B) a compound including silica, and (C) amorphous luminescent chips. The artificial marble has a total surface area and the luminescent chips (C) can be distributed in about 3 to about 10% of the total cross-sectional area of the artificial marble.

In some embodiments, the luminescent chips (C) can be distributed in about 3, 4, 5, 6, 7, 8, 9, or 10% of the total cross-sectional area of the artificial marble. Further, according to some embodiments of the present invention, the luminescent chips (C) can be distributed in an amount of from about any of the foregoing amounts to about any other of the foregoing amounts.

The artificial marble can include unsaturated polyester resin (A) in an amount of about 5 to about 15% by weight, compound including silica (B) in an amount of about 75 to about 92% by weight, and amorphous luminescent chips (C) in an amount of about 3 to about 10% by weight.

The artificial marble can further include organic and/or inorganic pigment (D) in an amount of about 0.01 to about 1 parts by weight based on about 100 parts by weight of a composition comprising the unsaturated polyester resin (A), the compound including silica (B), and the luminescent chips (C).

Herein, each of the components of the artificial marble composition are described in detail.

(A) Unsaturated Polyester Resin

The unsaturated polyester resin in accordance with the third embodiment is same as the resins described herein with reference to the first embodiment. However, in the third embodiment, the artificial marble can include the unsaturated polyester resin in an amount of about 5.0 to about 15.0% by weight based on the total weight (100% by weight) of a composition including the unsaturated polyester resin (A), the compound including silica (B), and the amorphous luminescent chips (C).

In some embodiments, the artificial marble can include the unsaturated polyester resin (A) in an amount of about 5, 6, 7, 8, 9, 10, 11, 12, 13, 14, or 15% by weight. Further, according to some embodiments of the present invention, the unsaturated polyester resin (A) may be present in an amount of from about any of the foregoing amounts to about any other of the foregoing amounts.

If the artificial marble includes the unsaturated polyester resin in an amount less than about 5.0% by weight, the binding force with natural stone particles can be reduced. If the artificial marble includes the unsaturated polyester resin in an amount greater than about 15.0% by weight, then the appearance and texture of the natural stone can be impaired.

(B) Compound Including Silica

The compound including silica in accordance with the third embodiment can be the same as the one described herein with reference to the first embodiment. However, in the third embodiment, the compound including silica can include natural stone particles (B1) in an amount of about 50 to about 80% by weight and inorganic filler (B2) in an amount of about 20 to about 50% by weight.

In some embodiments, the compound including silica (B) can include the natural stone particles (B1) in an amount of about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80% by weight. Further, according to some embodiments of the present invention, the natural stone particles (B1) may be present in an amount of from about any of the foregoing amounts to about any other of the foregoing amounts.

In some embodiments, the compound including silica (B) can include inorganic filler (B2) in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50% by weight. Further, according to some embodiments of the present invention, the inorganic filler (B2) may be present in an amount of from about any of the foregoing amounts to about any other of the foregoing amounts.

In some embodiments, the artificial marble can include the compound including silica (B) in an amount of about 75, 76, 77, 78, 79, 80, 81, 82, 83, 84, 85, 86, 87, 88, 89, 90, 91, or 92% by weight. Further, according to some embodiments of the present invention, the compound including silica (B) may be present in an amount of from about any of the foregoing amounts to about any other of the foregoing amounts.

(C) Luminescent Chip

In the third embodiment, the luminescent chip (C) is a compositional element to give a partial luminescence effect on the artificial marble. The luminescent chip can have a similar appearance as in the existing natural stone particles in a bright place, while in dark places, it can display luminescence because of the luminescent pigment which includes luminescent chips.

The artificial marble can include amorphous luminescent chips (C) in an amount of about 3 to about 10% by weight. In some embodiments, the artificial marble can include the luminescent chips (C) in an amount of about 3, 4, 5, 6, 7, 8, 9, or 10% by weight. Further, according to some embodiments of the present invention, the luminescent chips may be present in an amount of from about any of the foregoing amounts to about any other of the foregoing amounts.

The Luminescent Composition Used to Make the Luminescent Chips

To exhibit an excellent luminescence effect, the luminescent chips in accordance with the present invention can be prepared using a luminescent composition including an unsaturated polyester resin in an amount of about 5 to about 15% by weight, a compound including silica in an amount of about 80 to about 93% by weight, and luminescent pigment (E) in an amount of about 2 to about 5% by weight. This luminescent composition can be molded and crushed to form amorphous chips.

The unsaturated polyester resin (A) can be the same as the unsaturated polyester resin of the artificial marble composition in order to increase the binding force.

In some embodiments, the luminescent composition can include the unsaturated polyester resin (A) in an amount of about 5, 6, 7, 8, 9, 10, 11, 12, 13, 14, or 15% by weight. Further, according to some embodiments of the present invention, the unsaturated polyester resin (A) may be present in an amount of from about any of the foregoing amounts to about any other of the foregoing amounts.

The compound including silica used to prepare the luminescent chip (C) can be the same as the compound including silica (B).

In some embodiments, the luminescent composition can include the compound including silica (B) in an amount of about 80, 81, 82, 83, 84, 85, 86, 87, 88, 89, 90, 91, 92, or 93% by weight. Further, according to some embodiments of the present invention, the compound including silica (B) may be present in an amount of from about any of the foregoing amounts to about any other of the foregoing amounts.

In the luminescent chip (C), the natural stone particle (B1) can be included in an amount of about 50 to about 80% by weight, based on the total weight (100% by weight) of the luminescent chip (C). This is because the luminescent chip with a similar appearance and texture as in the natural stone particles can be formed by using this ratio.

The same inorganic filler (B2) as the inorganic filler which is used in the artificial marble compound can also be used. The inorganic filler (B2) can be included in an amount of about 20 to about 50% by weight based on the total weight (100% by weight) of the luminescent chip (C).

If the amount of inorganic filler is less than about 20% by weight, the mechanical property can be impaired due to hindrance in the product molding process. If the amounts of the inorganic filler is greater than about 50% by weight, then the amount of the unsaturated polyester resin can become too high, which can reduce the surface hardness.

A luminescent pigment (E) is a compositional element which gives a luminescence effect to the luminescent chip (C) and the artificial marble. Any conventional luminescent pigment known in the art can be used for this purpose. Examples of the luminescent pigment include without limitation aluminate strontium series pigments, zinc sulfate pigments, and the like, and mixtures thereof.

The luminescent pigment can have an average particle diameter of about 6 to about 150 μm. In some embodiments, the luminescent pigment (C) can have an average particle diameter of about 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, or 150 μm. Further, according to some embodiments of the present invention, the luminescent pigment (C) can have an average particle diameter from about any of the foregoing amounts to about any other of the foregoing amounts.

If the average particle diameter of the luminescent pigment is less than about 6 μm, the property of luminescence can be reduced. If the average particle diameter of the luminescent pigment is greater than about 150 μm, then radiation time of the light to make saturation at the initial stage becomes longer.

Because the luminescent pigment is costly, it can be important to maximize the luminescent performance in the artificial marble. Therefore, the luminescent pigment (C) can be used in the luminescent composition used to make the luminescent chips in an amount of about 2.0 to about 5.0% by weight, based on the total weight (100% by weight) of the luminescent composition. In some embodiments, the artificial marble can include the luminescent pigment in an amount of about 2, 3, 4, or 5% by weight. Further, according to some embodiments of the present invention, the luminescent pigment may be present in an amount of from about any of the foregoing amounts to about any other of the foregoing amounts.

If the luminescent pigment is used in an amount less than about 2.0% by weight, then sufficient luminescence performance may not be achieved. If the luminescent pigment is used in an amount greater than about 5.0% by weight, then it may not be economically feasible.

In the luminescent chip (C), the hardening agent (F1), hardening accelerator (F2), and cross-linking agent (F3) can additionally be included. The hardening agent (F1) can be used in an amount of about 0.01 to about 0.03 parts by weight, based on about 100 parts by weight of the luminescent chip composition including the unsaturated polyester resin (A), compound including silica (B), and luminescent pigment (E).

The hardening accelerator (F2) can be used in an amount of about 0.01 to about 0.03 parts by weight, based on about 100 parts by weight of the luminescent chip composition including the unsaturated polyester resin (A), compound including silica (B), and luminescent pigment (E).

A silane cross-linking agent can also be used as a cross-linking agent (F3). The silane cross-linking agent can be used in an amount of about 0.05 to about 0.15 parts by weight, based on about 100 parts by weight of the luminescent chip composition including unsaturated polyester resin (A), compound including silica (B), and luminescent pigment (E).

The luminescent chip (C) prepared as described above is a compositional element which is added in the artificial marble composition. The average particle size of the luminescent chip (C) can range from about 0.1 to about 9.0 mm which is also the average particle size of the natural stone particle (B1). In exemplary embodiments, the average particle size of the luminescent chip (C) can range from about 0.1 to about 5.6 mm.

(D) Organic and/or Inorganic Pigment

The organic and/or inorganic pigment in accordance with the third embodiment can be used to diversify the color which exhibits a luminescence. Examples of the organic and/or inorganic pigment can include without limitation azo series pigments, phthalocyanine series pigments, and the like, and mixtures thereof.

The organic and/or inorganic pigments can be used in minute amounts, for example about 0.01 to about 1.0 parts by weight based on about 100 parts by weight of the composition including the unsaturated polyester resin (A), a compound including silica (B), and the luminescent chips (C). In some embodiments, the artificial marble can include the organic and/or inorganic pigment in an amount of about 0.1, 0.2, 0.3, 0.4, 0.5, 0.6, 0.7, 0.8, 0.9, or 1 part by weight. Further, according to some embodiments of the present invention, the organic and/or inorganic pigment may be present in an amount of from about any of the foregoing amounts to about any other of the foregoing amounts.

(F) Other Additives

The artificial marble can further include a hardening agent (F1) to solidify the artificial marble and a hardening accelerator (F2) to enhance the hardening process. The artificial marble can include the hardening agent (F1) in an amount of about 0.01 to about 0.03 parts by weight and the hardening accelerator (F2) in an amount of about 0.01 to about 0.03 parts by weight, each based on about 100 parts by weight of the composition comprising the unsaturated polyester resin (A), the compound including silica (B), and the luminescent chips (C).

In addition, the artificial marble can further include a cross-linking agent (F3) to bind unsaturated polyester resin, natural stone particles, and inorganic fillers. Silane cross-linking agents can be used as the cross-linking agent (F3). The artificial marble can include the cross-linking agent in an amount of about 0.05 to about 0.15 parts by weight, based on about 100 parts by weight of the composition comprising the unsaturated polyester resin (A), the compound including silica (B), and the luminescent chips (E).

Method of Preparation of the Artificial Marble in Accordance with the Third Embodiment Preparation of Luminescent Chip The luminescent chips can be prepared by the steps of:

preparing a luminescent chip composition, forming the luminescent chip composition into a particular shape (for example by dispersing or directing the luminescent chip composition into conventional dispersing equipment known in the art for molding of a curable resin composition), molding the luminescent chip composition under conditions suitable to form an article (also referred to herein as a plate) having a luminescent effect (for example by subjecting the luminescent chip composition to a vacuum-vibration-compression molding process as known in the art), and crushing the article (also referred to herein as the plate material) to provide luminescent chips having a luminescence effect.

The luminescent chip composition can include an unsaturated polyester resin (A) in an amount of about 5 to about 15% by weight, a compound containing silica (B) in an amount of about 80 to about 93% by weight, and the luminescent pigment (E) in an amount of about 2 to about 5% by weight.

In addition, the luminescent chip composition can include a hardening agent (F1) in an amount of about 0.1 to about 0.3 parts by weight, a hardening accelerator (F2) in an amount of about 0.01 to about 0.03 parts by weight, and a silane cross-linking agent (F3) in an amount of about 0.05 to about 0.15 parts by weight, each based on about 100 parts by weight of the luminescent chip composition comprising the unsaturated polyester resin (A), compound containing silica (B), and luminescent pigment (E).

Preparation of Artificial Marble

An artificial marble in accordance with the third embodiment can be prepared using the following steps:

preparing an artificial marble composition, forming the artificial marble composition into a particular shape (for example by dispersing or directing the artificial marble composition into conventional dispersing equipment known in the art for molding of a resin composition), and molding the artificial marble composition under conditions suitable to form an article (also referred to herein as a plate) having a luminescent effect (for example by subjecting the artificial marble composition to a vacuum-vibration-compression molding process as known in the art).

The artificial marble composition can be prepared by mixing an unsaturated polyester resin (A) in an amount of about 5 to about 15% by weight, a compound containing silica (B) in an amount of about 75 to about 92% by weight, and luminescent chips (C) in an amount of about 3 to about 10% by weight.

In addition, the artificial marble composition can further include organic and/or inorganic pigment (D) in an amount of about 0.01 to parts by weight, a hardening agent (F1) in an amount of about 0.1 to about 0.3 parts by weight, a hardening accelerator (F2) in an amount of about 0.01 to about 0.03 parts by weight, and silane cross-linking agent (F3) in an amount of about 0.05 to about 0.15 parts by weight, each based on about 100 parts by weight of the artificial marble composition comprising the unsaturated polyester resin (A), the compound containing silica (B), and the luminescent chips (C).

After the artificial marble composition is prepared, it can be directed or dispersed to suitable conventional dispersing equipment to form the composition into a desired shape.

Once the artificial marble composition is evenly dispersed, the luminescent artificial marble can be prepared by subjecting the artificial marble composition to a vacuum-vibration-compression molding process also as known in the art.

Hereinafter, examples in accordance with the present invention are described. However, the following examples are provided for the purpose of exemplifying this invention and should not be interpreted as a limitation or restriction to the scope of protection of the present invention.

Exemplary Embodiments

Example for the First Embodiment

Preparation of Sample (A) Unsaturated polyester (UPE) resin

An unsaturated polyester (UPE) resin M900 resin from Aekyung Chemical is used for the artificial marble.

(B) Compound containing silica (B1) Natural stone particle (b11) Silica sand

Silica sand having an average particle diameter of 0.1 to 1.2 mm from Ire General Materials is used.

(b12) Quartz chip

Quartz chips from 21 Century Silica having an average particle diameter of 1.2 to 9.0 mm is used.

(B2) Inorganic fillers

Silica powder from 21 Century Silica having an average particle diameter 12 μm is used.

(C) Luminescent pigment

PL-120 luminescent pigment from Wookseong Chemical (Co. Ltd) having an average particle size of 25 μm is used.

(D) Organic and/or inorganic pigment

TR92 pigment from Woosin Pigment is used.

(E) Other additives (E1) TBPB from Seki arkema (Luperox P) is used as a hardening agent.

(E2) 6% Co-Octoate from Jinyang Chemical is used as a hardening accelerator.

(E3) Silane coupling agent from Gudam (WD70) is used as a cross-linking agent.

Physical Property Evaluation Method (1) Maximum brightness: After irradiating the artificial marble with 200 lux using a commonly used light source DN65 for 20 min., the initial brightness is measured after 5 min.

(2) Minimum brightness: After irradiating the artificial marble with 200 lux using a commonly used light source DN65 for 20 min., the brightness 60 min. is measured after 60 min.

(3) Natural stone texture: The artificial marble is examined by the naked eye and rated (or classified) whether the artificial marble forms a texture closer to natural stones (OK—rating good) or not (NG—rating not good).

(4) Surface hardness (Barcol): Barcol hardness is measured using the method specified in ASTM D 2583.

EXAMPLE 1

An artificial marble is prepared by mixing 7% by weight unsaturated polyester resin, 13% by weight silica sand, 55% by weight quartz chips, 23% by weight silica powder, 2% by weight luminescent pigment, 0.1% by weight organic and/or inorganic pigment, 0.2% by weight hardening agent, 0.02% by weight hardening accelerator, and 0.1% by weight silane cross-linking agent and the mixture is solidified (cured). The physical properties of the resultant artificial marble is measured and the results are set forth below in Table 2.

EXAMPLE 2 AND COMPARATIVE EXAMPLE 1 TO 5

The artificial marbles of Example 2 and Comparative Examples 1 to 5 are prepared using the same method described in Example 1, except for using the amounts of components set forth in Table 1.

TABLE 1

|  | Example | | Comparative Example | | | | |
|---|---|---|---|---|---|---|---|
|  | 1 | 2 | 1 | 2 | 3 | 4 | 5 |
| (A) UPE resin | 7 | 10 | 10.4 | 9.8 | 10 | 10 | 20 |
| (B1) (b11) Silica sand | 13 | 52 | 54.2 | 51.1 | 60 | 0 | 43 |
| (b12) Quartz chip | 55 | 5 | 5.2 | 4.9 | 0 | 53 | 5 |
| (B2) Silica powder | 23 | 28 | 29.2 | 27.4 | 28 | 35 | 30 |
| (C) Luminescent pigment | 2 | 5 | 1 | 7 | 2 | 2 | 2 |

(Unit: % by weight)

TABLE 2

|  |  | Maximum Brightness (mcd/m$^2$) | Minimum Brightness (mcd/m$^2$) | Texture | Surface Hardness |
|---|---|---|---|---|---|
| Example | 1 | 124 | 9 | OK | 96 |
|  | 2 | 137 | 11 | OK | 91 |
| Comparative Example | 1 | 74 | 3 | OK | 92 |
|  | 2 | 144 | 11 | NG | 91 |
|  | 3 | 92 | 3 | NG | 91 |
|  | 4 | 65 | 6 | NG | 92 |
|  | 5 | 60 | 5 | NG | 83 |

As can be seen from Table 2, Examples 1 and 2 have excellent initial brightness and long lasting luminescence effect, and a natural texture without impairing the surface hardness. In contrast, Comparative Example 1, which includes less luminescent pigment, the luminescence property is reduced. Comparative Example 2 shows excellent luminescence, but the natural stone texture is reduced. In addition, in both Comparative Example 3, in which only silica sand is used as the natural stone particle, and Comparative Example 4, in which only quartz chip is used as the natural stone particle, show reduced luminescence and natural stone texture. In Comparative Example 5, in which an unsaturated polyester resin is used in excess, not only the luminescence but the natural stone texture is also reduced.

Example for the Second Embodiment
Preparation of Sample
(A) Unsaturated polyester (UPE) resin
An unsaturated polyester (UPE) resin from Aekyung Chemical M900 is used for artificial marble.
(B) Compound containing silica
(B1) Natural stone particle
(B1) Silica sand
Silica sand from Ire General Materials is used having an average particle diameter of 0.1 to 1.2 mm.
(B2) Quartz chip
Quartz chip from 21 Century Silica is used having an average particle diameter of 1.2 to 9.0 mm.
(B2) Inorganic filler
Silica powder from 21 Century Silica is used having an average particle diameter of 12 μm.
(C) Organic and/or inorganic pigment
TR92, 318M, Y8G, Y6R, and R110 pigments from Woosin Pigment are used.
(D) Luminescent pigment
(PL-120) luminescent pigment from Wookseong Chemical (Co. Ltd) is used having an average particle diameter of 25 μm.
(E) Other additives (E1) Luperox P (TBPB) from Seki Akema is used as a hardening agent.
(E2) 6%-Co-Octoate from JinYang Chemical is used as a hardening accelerator.
(E3) Silane coupling agent from Gudam (WD70) is used a cross-linking agent.
Physical Properties Testing Method
The physical properties are measured using the same methods described in the first exemplary embodiment above.

EXAMPLE 3

A non-luminescent material (I') is prepared by mixing 7% by weight unsaturated polyester resin, 16% by weight silica sand, 55% by weight quartz chip, and 22% by weight silica powder in a first mixer. The non-luminescent material (I') is then mixed with 0.1 parts by weight organic and/or inorganic pigment, 0.2 parts by weight hardening agent, 0.02 parts by weight hardening accelerator, and 0.1 parts by weight silane cross-linking agent, each based on 100 parts by weight of the non-luminescent material (I'), in a second mixer to prepare a non-luminescent resin composition (I'').

A luminescent resin composition (II') including 9.6% by weight unsaturated polyester resin, 47.9% by weight silica sand, 13.8% by weight quartz chip, 26.6% by weight silica powder, and 2.1% by weight luminescent pigment is mixed with 0.2 parts by weight hardening agent, 0.02 parts by weight hardening accelerator, and 0.1 parts by weight silane cross-linking agent 0.1 parts, each based on 100 parts by weight of the luminescent resin composition (II'), in a third mixer.

90% by weight of the non-luminescent resin composition (I'') and 10% by weight of the luminescent resin composition (II') are mixed in a fourth mixer to form an artificial marble composition.

The artificial marble composition is formed and solidified to prepare an artificial marble. The physical properties of the artificial marble are measured, and the results are set forth in Table 4.

EXAMPLE 4

An artificial marble composition is prepared in the same manner described in the Example 3, except using 80% by weight of the non-luminescent resin composition (I'') and 20% by weight of the luminescent resin composition (II') as noted in the following Table 4.

EXAMPLE 5

A luminescent resin composition (II') is prepared in the same manner as described in Example 3, except that the luminescent resin composition (II') is prepared by mixing 9.3% by weight an unsaturated polyester resin, 46.4% by weight silica sand, 13.4% by weight quartz chip, 25.7% by weight silica powder, and 5% by weight luminescent pigment. The luminescent resin composition (II') is mixed with 0.2 parts by weight hardening agent, 0.02 parts by weight hardening accelerator, and 0.1 parts by weight silane cross-linking agent, each based on 100 parts by weight of the luminescent resin composition (II'), in a third mixer.

COMPARATIVE EXAMPLE 6

An artificial marble composition is prepared in the same manner as in Example 3, except using 97% by weight of the non-luminescent resin composition (I''') and 3% by weight of the luminescent resin composition (II') as noted in the following Table 4.

COMPARATIVE EXAMPLE 7

An artificial marble composition is prepared in the same manner as in Example 3, except using 60% by weight of the non-luminescent resin composition (I'') and 40% by weight luminescent resin composition (II').

COMPARATIVE EXAMPLE 8

The luminescent resin composition (II') is prepared in the same manner as in Example 3, except that the luminescent resin composition (II') is prepared by mixing a luminescent resin composition (II') including 9.7% by weight unsaturated polyester resin, 48.4% by weight silica sand, 14% by weight quartz chip, 26.9% by weight silica powder, and 1.1% by weight luminescent pigment with 0.2 parts by weight hardening agent, 0.02 parts by weight hardening accelerator, and 0.1 parts by weight silane cross-linking agent, each based on 100 parts by weight of the luminescent resin composition (II'), in a third mixer.

COMPARATIVE EXAMPLE 9

The luminescent resin composition (II') is prepared in the same manner as in Example 3, except that a luminescent resin composition (II') including 8.8% by weight unsaturated polyester resin, 44.1% by weight silica sand, 12.7% by weight quartz chip, 24.5% by weight silica powder, and 6.9% by weight luminescent pigment is mixed with 0.2 parts by weight hardening agent, 0.02 parts by weight hardening accelerator, and 0.1 parts by weight silane cross-linking agent, each based on 100 parts by weight of the luminescent resin composition (II'), in a third mixer.

COMPARATIVE EXAMPLE 10

A non-luminescent resin composition (I'') is prepared in the same manner as in Example 3, except that a non-luminescent material (I') is prepared by mixing in a first mixer 12.2% by weight unsaturated polyester resin, 61.2% by weight % silica sand, 5.1% by weight quartz chip, and 31.6% by weight silica powder. The non-luminescent material (I') is then mixed with 0.1 parts by weight organic and/or inorganic pigment, 0.2 parts by weight hardening agent, 0.02 parts by weight hardening accelerator, and 0.1 parts by weight silane cross-linking agent, each based on 100 parts by weight of the non-luminescent material (I'), in a second mixer.

COMPARATIVE EXAMPLE 11

A non-luminescent resin composition (I'') is prepared in the same manner as in Example 3, except that a non-luminescent material (I') is prepared by mixing in a first mixer 6% by weight unsaturated polyester resin in, 16% by weight silica sand, 56% by weight quartz chip, and 22% by weight silica powder. The non-luminescent material (I') is then mixed with 0.1 parts by weight organic and/or inorganic pigment, 0.2 parts by weight hardening agent, 0.02 parts by weight hardening accelerator, and 0.1 parts by weight silane cross-linking agent, each based on 100 parts by weight of the non-luminescent material (I'), in a second mixer.

TABLE 3

| | | | Example | | | Comparative Example | | | | | |
|---|---|---|---|---|---|---|---|---|---|---|---|
| | | | 3 | 4 | 5 | 6 | 7 | 8 | 9 | 10 | 11 |
| (I) Non-luminescent resin composition | (A) UPE | | 7 | 7 | 7 | 7 | 7 | 7 | 7 | 12.2 | 6 |
| | (B1) | (b11) Silica sand | 16 | 16 | 16 | 16 | 16 | 16 | 16 | 61.2 | 16 |
| | | (b12) Quartz chip | 55 | 55 | 55 | 55 | 55 | 55 | 55 | 5.1 | 56 |
| | (B2) Silica powder | | 22 | 22 | 22 | 22 | 22 | 22 | 22 | 31.6 | 22 |
| | (C) Organic/Inorganic pigment | | 0.1 | 0.1 | 0.1 | 0.1 | 0.1 | 0.1 | 0.1 | 0.1 | 0.1 |
| (II) Luminescent resin composition | (A) UPE | | 9.6 | 9.6 | 9.3 | 9.6 | 9.6 | 9.7 | 8.8 | 9.6 | 9.6 |
| | (B1) | (b11) Silica sand | 47.9 | 47.9 | 46.4 | 47.9 | 47.9 | 48.4 | 44.1 | 47.9 | 47.9 |
| | | (b12) Quartz chip | 13.8 | 13.8 | 13.4 | 13.8 | 13.8 | 14 | 12.7 | 13.8 | 13.8 |
| | (B2) Silica powder | | 26.6 | 26.6 | 25.7 | 26.6 | 26.6 | 26.9 | 24.5 | 26.6 | 26.6 |
| | (C) Organic/inorganic pigment | | 2.1 | 2.1 | 5 | 2.1 | 2.1 | 1.1 | 6.9 | 2.1 | 2.1 |

(Unit: % by weight)

weight hardening agent, 0.02 parts by weight hardening

TABLE 4

| | Example | | | Comparative Example | | | | | |
|---|---|---|---|---|---|---|---|---|---|
| | 3 | 4 | 5 | 6 | 7 | 8 | 9 | 10 | 11 |
| (I) Non-luminescent resin composition (% by weight) | 90 | 80 | 90 | 97 | 60 | 90 | 90 | 90 | 90 |
| (II) Luminescent resin composition (% by weight) | 10 | 20 | 10 | 3 | 40 | 10 | 10 | 10 | 10 |
| Maximum brightness in | 115 | 115 | 132 | 115 | 115 | 63 | 145 | 94 | 64 |

TABLE 4-continued

|  | Example | | | Comparative Example | | | | | |
| --- | --- | --- | --- | --- | --- | --- | --- | --- | --- |
|  | 3 | 4 | 5 | 6 | 7 | 8 | 9 | 10 | 11 |
| luminescent part (mcd/m$^2$) Minimum brightness in luminescent part (more than 7 mcd/m$^2$ means OK) | 10 | 11 | 13 | 9 | 11 | 4 | 14 | 8 | 4 |
| Natural stone texture | OK | OK | OK | NG | NG | OK | NG | NG | NG |
| Surface hardness (Barcol) | 95 | 94 | 94 | 94 | 94 | 95 | 93 | 88 | 80 |

FIGS. 6a-6d are photos showing the appearance of an artificial marble prepared using different amounts of the luminescent resin composition (II') as indicated therein in accordance with Comparative Example 6, Example 3, Example 4, and Comparative Example 7, respectively. From these photos, it is clear that the Examples 3 to 5 do not impair the surface hardness, have excellent initial brightness with long lasting luminescence effect, while maintaining the natural stone texture.

Comparative Example 6, which includes the luminescent resin composition (II') in an amount less than the invention, and Comparative Example 7, which includes the luminescent resin composition (II') in an amount greater than the invention, show a reduced natural stone texture. In addition, in Comparative Example 8, which includes the luminescent pigment in an amount less than the invention, the luminescence effect is reduced. In Comparative Example 9, which includes the luminescent pigment in an amount greater than the invention, and in Comparative Example 10, which includes the unsaturated polyester resin an amount less than the invention, the natural stone texture as well as the surface hardness is reduced.

Example for the Third Embodiment
Sample Preparation
(A) Unsaturated polyester (UPE) resin
Unsaturated polyester resin from Aekyung Chemical M900 is used for the artificial marble.
(B) Compound containing silica
(B1) Natural stone particle
(B1) Silica sand
Silica sand from Ire General Materials is used having an average particle diameter of 0.1 to 1.2 mm.
(B2) Quartz chip
Quartz chip from 21 Century Silica is used having an average particle diameter of 1.2 to 90 mm
(B2) Inorganic filler
Silica powder from 21 Century Silica is used having an average particle diameter
(F2) 6%-Co-Octoate Cobalt from JinYang Chemical is used as a hardening accelerator.
TR92, 318M, and Y6G from Woosin Pigment are used.
(E) Luminescent pigment
(PL-120) luminescent pigment from Wookseong Chemical (Co. Ltd) is used having an average particle diameter of 25 μm.
(F) Other additives
(F1) Luperox P (TBPB) from Seki Akema is used as a hardening agent.
(F2) 6%-Co-Octoate from JinYang Chemical is used as a hardening accelerator.
(F3) Silane coupling agent from Gudam (WD70) is used as a cross-linking agent.

Physical Properties Evaluation Method
(1) Distribution area of the luminescent chip: Ratio of the surface area in the luminescent amorphous pattern for a total surface area of the artificial marble is measured.
(2) Natural stone texture: The artificial marble is examined by the naked eye and rated (or classified) whether the artificial marble forms a texture closer to natural stones (OK—rating good) or not (NG—rating not good).
(3) Surface hardness (Barcol): Barcol hardness is measured using the method in accordance with ASTM D 2583.
(4) Time wise brightness: After irradiating the artificial marble with 200 lux using a common DN65 light source till reaching the saturation stage, the brightness is measured after 5, 10, 20, and 60 min.

EXAMPLE 6

(1) Preparation of the Luminescent Chip
A luminescent chip is prepared using a composition including 14% by weight unsaturated polyester resin, 30% by weight silica sand, 27% by weight quartz chip, 27% by weight silica powder, and 2% by weight the luminescent pigment mixed with 0.15% by weight hardening agent, 0.015% by weight hardening accelerator, and 0.08% by weight silane cross-linking agent.

(2) Preparation of the Artificial Marble
An artificial marble is prepared using a composition including 10% by weight unsaturated polyester resin, 34% by weight silica sand, 30% by weight quartz chip, 24% by weight silica powder, 0.5% by weight organic and/or inorganic pigment, and 3% by weight luminescent chip mixed with 0.15% by weight hardening agent, 0.015% by weight hardening accelerator, and 0.08% by weight silane cross-linking agent.

The content (amounts) of the components of the luminescent chip and the artificial marble for Examples 6-7 and Comparative Examples 12-16 are set forth in Table 5.

The properties of the luminescent chip and the artificial marble are evaluated, and the results are set forth in Table 6.

EXAMPLE 7 AND COMPARATIVE EXAMPLES 12 to 16

The luminescent chip and the artificial marble of Example 7 and Comparative Examples 12-16 are prepared in the same manner as described in Example 6, except for the contents (amounts) of the respective components used, which are given in the following Table 5. As noted above, the physical properties are measured and presented in Table 6.

TABLE 5

|  |  | Example | | Comparative Example | | | | |
|---|---|---|---|---|---|---|---|---|
|  |  | 6 | 7 | 12 | 13 | 14 | 15 | 16 |
| Luminescent chip | (A) UPE | 14 | 13.6 | 14.1 | 14 | 14 | 14 | 13.6 |
|  | (B1) (b11) Silica sand | 30 | 29.1 | 30.3 | 30 | 30 | 30 | 29.1 |
|  | (b12) Quartz chip | 27 | 26.2 | 27.3 | 27 | 27 | 27 | 26.2 |
|  | (B2) Silica powder | 27 | 26.2 | 27.3 | 27 | 27 | 27 | 26.2 |
|  | (E) Luminescent pigment | 2 | 4.9 | 1 | 2 | 2 | 2 | 4.9 |
| Artificial marble | (A) UPE | 9.9 | 9.4 | 9.9 | 10.1 | 9.1 | 4.2 | 17.2 |
|  | (B1) (b11) Silica sand | 33.6 | 32 | 33.6 | 34.3 | 30.9 | 35.8 | 29.3 |
|  | (b12) Quartz chip | 29.7 | 28.3 | 29.7 | 30.3 | 27.2 | 31.5 | 25.8 |
|  | (B2) Silica powder | 23.7 | 22.6 | 23.7 | 24.2 | 21.8 | 25.2 | 20.7 |
|  | (C) Luminescent chip | 3 | 7.6 | 3 | 1 | 10.9 | 3.2 | 6.9 |
|  | (D) Organic and/or inorganic pigment | 0.1 | 0.1 | 0.1 | 0.1 | 0.1 | 0.1 | 0.1 |

(Unit: % by weight)

TABLE 6

|  | Example | | Comparative Example | | | | |
|---|---|---|---|---|---|---|---|
| Artificial marble | 6 | 7 | 12 | 13 | 14 | 15 | 16 |
| Distribution area of luminescent chip | 3% | 8% | 3% | 1% | 12% | 3% | 8% |
| Natural stone texture | OK | OK | OK | OK | NG | NG | NG |
| Barcol hardness | 92 | 93 | 91 | 92 | 91 | 63 | 75 |
| Brightness 5 min. | 59 | 68.5 | 27 | 45 | — | — | — |
| 10 min. | 40 | 46 | 15 | 26 | — | — | — |
| 20 min. | 22.5 | 29 | 6 | 12 | — | — | — |
| 60 min. | 7.5 | 11 | 1.5 | 6 | — | — | — |

Figure 9:
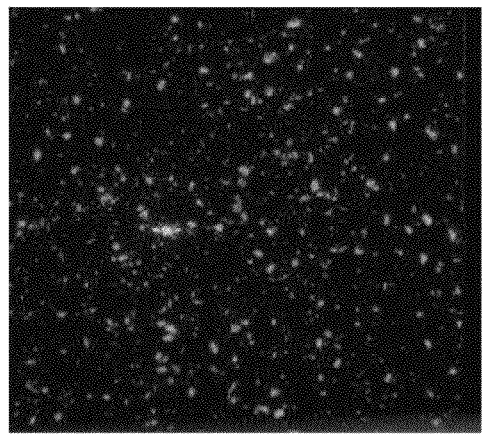
FIG. 9 is a photograph of artificial marble in accordance with Example 6.
Figure 10:
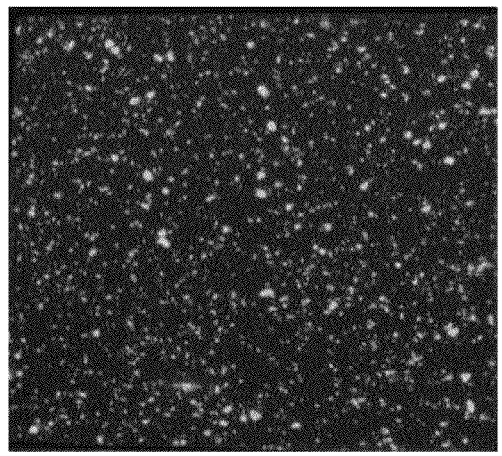
FIG. 10 is a photograph of artificial marble in accordance with Example 7.
Figure 11:
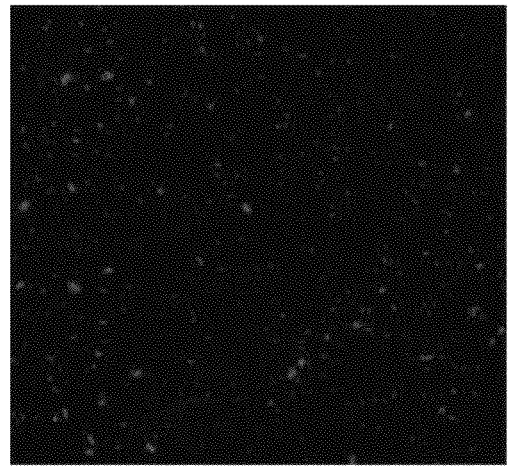
FIG. 11 is a photograph of artificial marble in accordance with Comparative Example 12.
Figure 12:
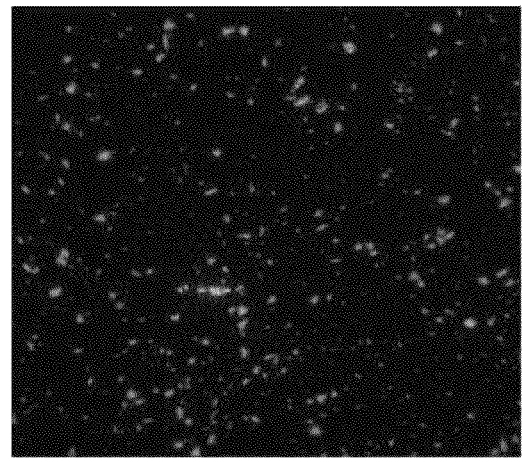
FIG. 12 is a photograph of artificial marble in accordance with Comparative Example 13.
Figure 13:
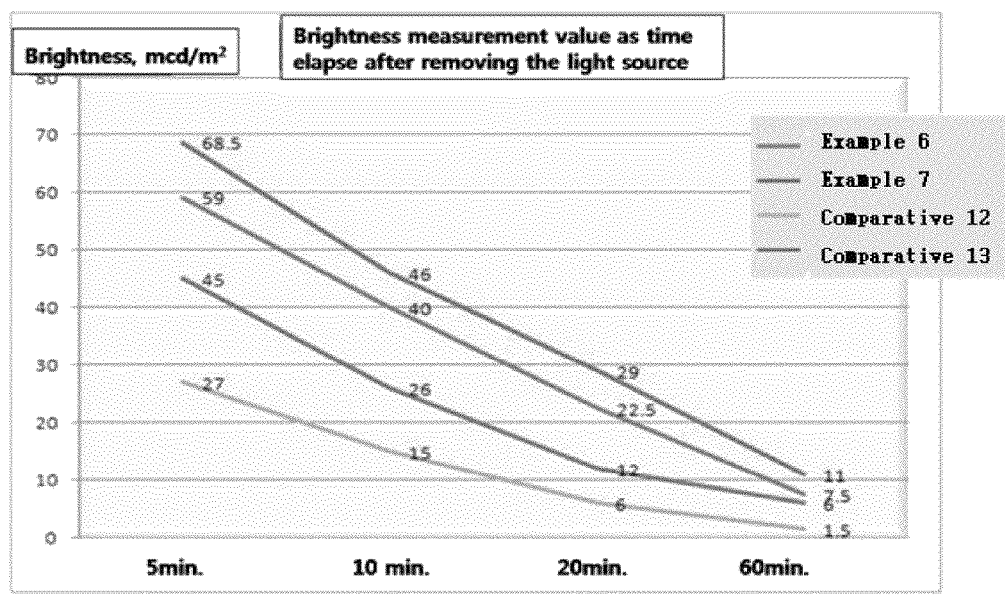
FIG. 13 is a graph illustrating the changes in brightness after removing a light source in accordance with the third embodiment of the invention.

FIG. 9 and FIG. 10 show the luminescence effect of the partially luminescent artificial marble of Example 6 and Example 7, respectively, and FIG. 11 and FIG. 12 show the luminescence effect of the artificial marble of Comparative Example 12 and Comparative Example 13, respectively. In addition, FIG. 13 shows the changes in the brightness after removing the light source.

As can be seen from Table 6, Example 6 and Example 7 show excellent initial brightness and a long lasting luminescence effect with natural stone texture, without reducing the surface hardness.

In contrast, Comparative Example 12, in which the luminescent pigment is used in a smaller amount than the invention, and Comparative Example 13, in which the luminescent chip is used in a smaller amount than the invention, show a reduced luminescence effect. In addition, in Comparative Example 14, in which an excess amount of the luminescent chip is used, the natural stone texture is reduced. In Comparative Example 15 and Comparative Example 16, in which unsaturated polyester resins are used in amounts greater than the present invention, do not have a good natural stone texture and also have reduced surface hardness.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

That which is claimed is:

1. An artificial marble comprising (A) about 7 to about 10% by weight unsaturated polyester resin, (B) about 85 to about 91% by weight compound including silica, and (C) about 2 to about 5% by weight luminescent pigment,
    wherein the compound including silica (B) comprises natural stone particle (B1) in an amount of about 50 to about 80% by weight and inorganic filler (B2) in an amount of about 20 to about 50% by weight,
    wherein the average particle diameter of the natural stone particle (B1) is from about 0.1 to about 9.0 mm,
    wherein the average particle size of the inorganic filler (B2) is less than about 20 μm,
    wherein the natural stone particle (B1) comprises silica sand (b1) in an amount of about 15 to about 93% by weight and quartz chip (b12) in an amount of about 7 to about 85% by weight,
    wherein the artificial marble has a maximum brightness of more than about 110 mcd/m$^2$, and wherein the artificial marble maintains a brightness of more than about 7 mcd/m$^2$ for more than one hour.

2. The artificial marble of claim 1, wherein the average particle size of the silica sand (b11) is about 0.1 to about 1.2 mm and wherein the average particle size of the quartz chip (b12) is about 1.2 to about 9.0 mm.

3. The artificial marble of claim 1, wherein the average particle size of the luminescent pigment (C) is about 6 to about 150 μm, and wherein the artificial marble further comprises organic pigment, inorganic pigment, or a combination thereof (D) in an amount of about 0.1 to about 1 parts by weight based on about 100 parts by weight of the unsaturated polyester resin (A), the compound including silica (B), and the luminescent pigment (C).

4. The artificial marble of claim 1, wherein the artificial marble further includes hardening agent (E1) in an amount of about 0.1 to about 0.2 parts by weight and hardening accelerator (E2) in an amount of about 0.01 to about 0.02 parts by weight, each based on about 100 parts by weight of the unsaturated polyester resin (A), the compound containing silica (B), and the luminescent pigment (C), and wherein the hardening agent (E1) is t-butylperoxy benzoate (TBPB) and the hardening accelerator (E2) is 6% cobalt octoate.

5. The artificial marble of claim 1, wherein the artificial marble further includes silane cross-linking agent (E3) in an amount of about 0.05 to about 0.1 parts by weight based on about 100 parts by weight of the unsaturated polyester resin (A), the compound containing silica (B), and the luminescent pigment (C).

6. An artificial marble comprising about 70 to about 95% by weight of a non-luminescent base material (I) comprising unsaturated polyester resin (A), compound including silica (B), and organic pigment, inorganic pigment, or a combination thereof (C); and about 5 to about 30% by weight of a luminescent amorphous pattern part (II) comprising unsaturated polyester resin (A), compound including silica (B), and luminescent pigment (D); wherein the artificial marble has a total surface area and wherein the amorphous pattern part (II) comprises about 5 to about 30% of the total surface area of the artificial marble.

7. The artificial marble of claim 6, wherein the non-luminescent base material (I) includes the unsaturated polyester resin (A) in an amount of about 7 to about 10% by weight and the compound including silica (B) in an amount of about 90 to about 93% by weight, based on the total weight of the unsaturated polyester resin (A) and the compound including silica (B), and wherein the non-luminescent base material (I) comprises organic pigment, inorganic pigment, or a combination thereof (C) in an amount of about 0.1 to about 1 parts by weight, based on about 100 parts by weight of the unsaturated polyester resin (A) and the compound including silica (B).

8. The artificial marble of claim 6, wherein the luminescent amorphous pattern part (II) comprises the unsaturated polyester resin (A) in an amount of about 7 to about 10% by weight, the compound including silica (B) in an amount of about 85 to about 91% by weight, and the luminescent pigment (D) in an amount of about 2 to about 5% by weight.

9. The artificial marble of claim 6, wherein the compound including silica (B) includes natural stone particle (B1) in an amount of about 50 to about 80% by weight and inorganic filler (B2) in an amount of about 20 to about 50% by weight, wherein the average particle diameter of the natural stone particle (B1) is from about 0.1 to about 9.0 mm, wherein the natural stone particle (B1) comprises silica sand (b11) in an amount of about 15 to about 93% by weight and quartz chip (b12) in an amount of about 7 to about 85% by weight, wherein the average particle diameter of the silica sand (b11) is from about 0.1 to about 1.2 mm and the average particle diameter of the quartz chip (b12) is from about 1.2 to about 9.0 mm, and wherein the average particle diameter of the inorganic filler (B2) is less than about 20μm.

10. The artificial marble of claim 6, wherein the average particle diameter of the luminescent pigment (D) is from about 6 to about 150 μm, wherein the maximum brightness of the artificial marble is more than about 110 mcd/m$^2$, and wherein artificial marble maintains a brightness higher than about 7 mcd/m$^2$ after about one hour.

11. A method of preparing artificial marble comprising the steps of:
preparing a non-luminescent resin composition (I") by mixing unsaturated polyester resin (A), compound including silica (B), and organic pigment, inorganic pigment, or a combination thereof (C);
preparing a luminescent resin composition (II') by mixing unsaturated polyester resin (A), compound including silica (B), and luminescent pigment (D);
preparing a composition (III) by mixing about 70 to about 95% by weight of the non-luminescent resin composition (I") and about 5 to about 30% by weight of the luminescent resin composition (II'); and
compression molding the composition (III) to form the artificial marble.

12. The method of claim 11, wherein the non-luminescent resin composition (I") comprises a non-luminescent base material (I') including the unsaturated polyester resin (A) in an amount of about 7 to about 10% by weight and the compound including silica (B) in an amount of about 90 to about 93% by weight and wherein the non-luminescent resin composition (I") further comprises the organic pigment, the inorganic pigment, or combination thereof (C) in an amount of about 0.1 to about 1 parts by weight, based on about 100 parts by weight of the non-luminescent base material including the unsaturated polyester resin (A) and the compound including silica (B), and wherein the luminescent resin composition (II') comprises the unsaturated polyester resin (A) in an amount of about 7 to about 10% by weight, the compound including silica (B) in an amount of about 85 to about 91% by weight, and the luminescent pigment (D) in an amount of about 2 to about 5% by weight.

13. The method of claim 11, wherein the compound including silica (B) comprises natural stone particle (B1) in an amount of about 50 to about 80% by weight and inorganic filler (B2) in an amount of about 20 to about 50% by weight, wherein the natural stone particles (B1) comprises silica sand (b11) in an amount of about 15 to about 93% by weight and quartz chip (b12) in an amount of about 7 to 85% by about weight, and wherein the non-luminescent resin composition (I') further includes hardening agent (E1) in an amount of about 0.1 to about 0.2 parts by weight, hardening accelerator (E2) in an amount of about 0.01 to about 0.02 parts by weight and silane cross-linking agent (E3) in an amount of about 0.05 to about 0.1 parts by weight, each based on about 100 parts by weight of the non-luminescent base material including the unsaturated polyester resin (A) and the compound including silica (B).

14. The method of claim 11, wherein the luminescent resin composition (II') further includes hardening agent (E1) in an amount of about 0.1 to about 0.2 parts by weight, hardening accelerator (E2) in an amount of about 0.01 to about 0.02 parts by weight, and silane cross-linking agent (E3) in an amount of about 0.05 to about 0.1 parts by weight, each based on about 100 parts by weight of the luminescent resin composition (II') including the unsaturated polyester resin (A), the compound containing silica (B) and the luminescent pigment (C).

15. An artificial marble comprising unsaturated polyester resin (A), compound including silica (B) and amorphous luminescent chips (C), wherein the artificial marble has a total cross-sectional area and wherein the luminescent chips (C) are distributed in the artificial marble in an area comprising about 3 to about 10% of the total cross-sectional area of the artificial marble.

16. A method of preparing an artificial marble, comprising the steps of:
preparing an amorphous luminescent chip (C);
preparing an artificial marble composition by mixing unsaturated polyester resin (A), compound including silica (B), the amorphous luminescent chip (C), and organic pigment, inorganic pigment, or a combination thereof (D);
forming the artificial marble composition into a shape; and
subjecting the artificial marble composition to vacuum-vibration-compression to uniformly distribute the amorphous luminescent chip (C) in the artificial marble composition and form an artificial marble.

17. The method of claim 16, wherein the amorphous luminescent chip (C) is prepared by the steps of:

mixing unsaturated polyester resin (A), compound including silica (B), and luminescent pigment (E) to form an amorphous luminescent chip composition;

forming the amorphous luminescent chip composition into a shape;

molding the amorphous luminescent chip composition by vacuum-vibration-compression to uniformly distribute the luminescent pigment (E) in the amorphous luminescent chip composition to form an article of the amorphous luminescent chip composition having a luminescence effect; and crushing the article to form the chips having a luminescent effect.

* * * * *